under 35 U.S.C. 154(b) by 0 days.

(12) United States Patent
Mino

(10) Patent No.: US 6,394,895 B1
(45) Date of Patent: May 28, 2002

(54) GAME APPARATUS, METHOD, STORING MEDIUM AND TRANSMITTING MEDIUM FOR PREDICTING RESULTS OF SPORTS

(76) Inventor: Akihiro Mino, 1-26-6, Minami Senzoku, Ota-ku, Tokyo (JP)

( * ) Notice: Subject to any disclaimer, the term of this patent is extended or adjusted under 35 U.S.C. 154(b) by 0 days.

(21) Appl. No.: 09/679,632

(22) Filed: Oct. 5, 2000

(30) Foreign Application Priority Data

Nov. 12, 1999 (JP) .......................................... 11-322347

(51) Int. Cl.[7] .............................................. A63F 13/00
(52) U.S. Cl. ............................. 463/3; 463/16; 463/40; 463/43; 273/139; 700/91
(58) Field of Search ............................. 463/16, 40–43, 463/3; 700/90–93; 273/139

(56) References Cited

U.S. PATENT DOCUMENTS

| | | | | |
|---|---|---|---|---|
| 4,592,546 A | * | 6/1986 | Fascenda et al. | 273/1 E |
| 4,722,526 A | * | 2/1988 | Tovar et al. | 273/1 E |
| 5,034,807 A | * | 7/1991 | Von Kohorn | 358/84 |
| 5,586,257 A | * | 12/1996 | Perlman | 463/42 |
| 5,683,090 A | * | 11/1997 | Zeile et al. | 273/269 |
| 5,759,101 A | * | 6/1998 | Von Kohorn | 463/40 |
| 5,779,549 A | * | 7/1998 | Walker et al. | 463/42 |
| 5,797,796 A | * | 8/1998 | Dickinson | 463/43 |
| 5,813,913 A | * | 9/1998 | Berner et al. | 463/40 |
| 6,135,881 A | * | 10/2000 | Abbott et al. | 463/3 |
| 6,135,885 A | * | 10/2000 | Lermusiaux | 463/20 |
| 6,292,706 B1 | * | 9/2001 | Birch et al. | 700/91 |

* cited by examiner

*Primary Examiner*—Joe H. Cheng
*Assistant Examiner*—Scott E. Jones
(74) *Attorney, Agent, or Firm*—Rabin & Berdo, P.C.

(57) ABSTRACT

A video game that can be played in parallel with the progress of an actual sports game is provided, in which RAM 10 stores a plurality of factors representing the situation of a game of, for example, professional baseball, such as team names, scores, counts (S, B, O), win-loss records data regarding specific pitchers and specific batters, a mouse 14 is operated by a video game player to input a prediction about a type and a course of the next pitch supposed to be thrown by a pitcher in a game of baseball actually being played into a determining apparatus 16, a prediction preparing apparatus 12 reads out data from the RAM 10 and predicts a type and a course of the same next pitch to input the prediction to the determining means 16, and the determining means 16 determines for the video game player's prediction and the data-based prediction whether the predictions are right or wrong by comparing them with the results.

3 Claims, 2 Drawing Sheets

GAME APPARATUS, METHOD, STORING MEDIUM AND TRANSMITTING MEDIUM FOR PREDICTING RESULTS OF SPORTS

BACKGROUND OF THE INVENTION

1. Field of the Invention

The present invention relates mainly to a game apparatus, method, storing medium and transmitting medium for predicting results of a sports game (sports contest) in parallel with the progress of an actual sports game.

2. Description of the Related Art

There have been various video games featuring sports. One of these video games is the type in which a video game player participates in a sports game acting as a very player of the sport. For example, in a baseball game, one of two video game players acts as a pitcher and the other video game player acts as a batter and both operate controllers with skilled techniques to pitch and hit a ball with good timing. Some video games in this category are arranged to produce different results by adding historical data of performances of actual professional baseball players. In addition, as a video game utilizing more data, there is a simulation game for developing sports teams. For example, in a video game simulating professional baseball, video game players make contracts with baseball player characters with the actual names and abilities of professional baseball players within a limit of a predetermined budget, build professional baseball teams with their favorite baseball players by trading baseball players with each other and make the teams compete for the pennant. Data of each actual baseball player are utilized in the pennant race simulation, and victory or defeat is determined.

However, there have been no video games that can proceed in parallel with the progress of a sports game that is actually being performed. In a sports game such as baseball in which plays are intermittent, there is a considerable interval between the time when a pitcher receives a ball from a catcher and the time when the pitcher throws the ball to a batter after deciding a course and a type of pitching (where and how to throw the pitch). It is great fun for spectators in a baseball stadium or viewers of a baseball program brought by a television broadcast to imagine and predict what type of ball a pitcher throws, whether a batter lets a pitch go by or swings, whether a runner starts or not, whether a manager and coaches are packing some surprises and so on, and to talk about the prediction with other spectators or viewers.

SUMMARY OF THE INVENTION

The present invention has been devised in view of the above, and an object of the present invention therefore mainly resides in providing a video game for predicting results of sports, which can be played while a user of the video game is watching an actual sports game.

In order to attain the above object, a game apparatus for predicting results of sports according to a first aspect of the present invention comprises: storing means for storing as data a plurality of factors changing and/or being generated and disappearing in accordance with a change in the situations of a game for a sports game that has actually been performed in the past; prediction inputting means (also referred to herein as "prospect inputting means") for inputting a video game player's prediction of how a particular factor, hereinafter "prediction subject factor," changes and/ or is generated and disappears (a result) for at least one factor out of the plurality of factors under the situations specified by the plurality of factors; prediction preparing means (also referred to herein as "prospect preparing means")for preparing a data-based prediction (for example, a computer-generated prediction) about the prediction subject factor; and determining means for receiving inputs including the video game player's prediction, the data-based prediction and result of the prediction subject factor, and for determining whether it is right or wrong for each of the predictions by comparing each of the predictions with the results.

In a game apparatus for predicting results of sports according to the first aspect of the present invention, a video game player makes a prediction on how a prediction subject factor changes and/or is generated and disappears under specific situations of a game indicated by a plurality of factors that change and/or are generated and disappear. The video game player's prediction is input via the prediction inputting means. On the other hand, a plurality of factors are stored as data in the storing means and the prediction preparing means prepares a data-based prediction about a result of the prediction subject factor based on the stored data. The determining means determines whether the prediction is right or wrong by comparing each prediction with the results of the prediction subject factor.

If a game apparatus is a computer, the storing means can consist of a main memory (RAM) storing data read out from an auxiliary memory of the computer, an auxiliary memory such as a hard disc, a CD-ROM, a magneto optical disc, a floppy disc and a ROM card, or the storing means may be comprised of a database connected to the computer. The prediction inputting means can consist of an inputting apparatus such as a pointing device, e.g., a keyboard and a mouse, and the prediction preparing means and the determining means can consist of a CPU. If the storing means is a database, the prediction preparing means and the determining means can consist of a host computer that is connected to the database via a communications network such as the internet, personal computer communication and a LAN, or of a host computer that is connected to the database not via a communications network, and the prediction inputting means can consist of a computer terminal that is connected to the host computer and via a communications network. If a game apparatus is a computer game machine for personal use, the storing means consists of a RAM, a CD-ROM or a ROM cassette, the prediction inputting means consists of a controller, and the prediction preparing means and the determining means consist of a CPU. It is also possible to use the telephone as the prediction inputting means and input a prediction in a host computer via a telephone communication network.

If a game apparatus is a computer, the computer executes each function of the above-mentioned storing means, prediction inputting means, prediction preparing means and the determining means with computer programs loaded therein. The programs are read by the computer via a storing medium such as a magneto optical disc, a ROM cassette, a floppy disc, a ROM disc, and a CD-ROM, or via a transmitting medium such as the internet and personal computer communication. However, a part of the above mentioned each function might be performed by an OS or a BIOS installed in the computer in advance, or an external computer such as a host computer connected via a communications network might alternatively execute a part of the functions.

Any sport can be played in the present invention, but one that progresses intermittently by elaborating tactics is more suitable than one requiring an instantaneous decision. Typically, baseball and American football are most suitable.

In the case of soccer, the present invention is not suitable for usual soccer plays where the decision made is instantaneous and the motion is consecutive, but it can be applied to a part of plays such as a penalty kick. In the case of baseball, factors stored in the storing means are such as teams, scores, counts (S, O, B), whether bases are empty or runners are on bases, stolen base percentage of specific runners, percentage of preventing base steals by specific catchers, win-loss records data regarding specific pitchers and batters, respective percentages of tactics for determining motions of batters and runners such as base steals, bunts, bunt-and-runs, hit-and-runs and ball waiting instructions for each team, each batter and each runner under a certain situation, and types and courses of balls thrown by specific pitchers, among which a prediction subject factor is thought to be a type of ball of the next pitch of a pitcher and tactics of a team at bat. For example, assume a situation in which a team takes the lead by three to two in the bottom of the ninth inning, the count is one out, one ball and one strike, a fast runner is on first base, the pitcher is a right-hander and the ace stopper, and a batter is a left-handed long ball hitter. In this situation, a prediction is made on whether the pitch will be a straight ball or a fork ball, where the pitcher will throw the ball, and what tactic the team at the bat will select: a base steal, a bunt, a hit-and-run, to give the batter latitude, etc.

In the case of American football, factors include the teams that are playing, whether the game is at home or away, the score, time left, position of ball on the field, the number of downs and yards left for gaining first down, the performance of each player, such as the quarterback and a running back, each team's respective percentages of use of particular tactics, and so on, and prediction subject factors are the tactics that will be used next: for example, run or pass, what course a running back will run, whether a pass will be short or long, to whom a pass will be thrown, and so on.

Factors varying due to the circumstance of a sports game and describing the situations of a sports game, that is, in the case of baseball, teams, scores, counts (S, O, B), whether the bases are empty or runners are on base, who is the pitcher, who is the batter and so on, are set by a video game player himself/herself if a game apparatus consists of one computer. If a computer terminal and a host computer are connected via a communications network, the factors are input to the host computer, data are transmitted via the communications network, and a specific situation is displayed on a display device of the computer terminal as text or as graphics. If a bitcast broadcast or a live broadcast showing images of a sports contest via a communications network such as the internet, the factors are not necessarily transmitted as data. However, the data are necessary in preparing a data-based prediction by the prediction preparing means. Further, the factors include those which can be expressed as figures (scores, counts, etc.), those which are objective (teams, pitchers, batters, etc.) and those which are bound to be subjective to some extent (types and courses of balls, tactics, etc.).

The simplest way to enter a prediction is to input it using a GUI screen. For example, an input operation is performed in the following manner: the predicted course of the next pitch is input by clicking with a mouse on any of nine divisions of a rectangular strike zone displayed on a display (outside of the divisions if the prediction is ball), a type of pitch is input by clicking on, for example, a leftward arrow icon for a curve ball of a right-handed pitcher, and a downward arrow icon for a fork ball, or a type of pitch is input by clicking on icons indicating the types of pitch (fastball, curve, change-up, slider, fork and so on).

A data-based prediction by the prediction preparing means, for example, for the next pitch, is generated based on recorded data of past interactions between a specific pitcher and a specific batter. That is, data-based prediction is performed on the premise that, if specific situations or similar situations took place in the past, it is highly possible that a type and a course of pitch actually thrown then is selected again. More concretely, a data-based prediction is generated in accordance with the following procedures:

(1) specifying a situation of a sports game: the teams, the score, the count (S, B, O), whether the bases are empty or runners are on base, the specific pitcher and the specific batter;

(2) retrieving from the storing means a type and a course of the next pitch in the past situation specified in (1), calculating a percentage of the same type and course of the pitch, and if the calculation result is equal to or greater than a given percentage, it is regarded as a data-based prediction;

(3) if (2) is less than the given percentage, calculating a percentage of a type and a course of pitch by the specific pitcher in the past at batters who are similarly left-handed or right-handed and belong to the same team as the specific batter and, if the calculation result is equal to or greater than a given percentage, it is regarded as a data-based prediction;

(4) if (3) is less than the given percentage, calculating percentages of types and courses of pitches by the specific pitcher in the past to all the batters belonging to the same team as does the specific batter and, if the calculation result for a particular type and course of pitch is equal to or greater than a given percentage or more, it is regarded as data-based prediction; and (5) if (4) is less than the given percentage, calculating a percentage of a type and a course of pitch by the specific pitcher in the past to all the batters on all the teams and regarding a type and a course of pitch with the highest percentage as a data-based prediction. Note that "a given percentage" in each process is not necessarily the same.

The result of the prediction subject factor is input by, for example, the video game player himself. Taking as an example the above-mentioned next pitch in baseball, a type and a course of pitch actually thrown by a pitcher are input. The actual result is compared with the video game player's prediction and with the data-based prediction, and it is determined whether the predictions are right or wrong. Then the factors that have varied in accordance with change in the prediction subject factors, i.e., the settings of counts and scores are updated. This readies the video game for the next prediction. If a host computer is utilized, the result of the prediction subject factor is input by a result inputting means connected to the host computer. The result inputting means may be an inputting means to the host computer such as a keyboard and a mouse and, if an operator is in a place where the sports game is held in order to make a precise input, the result inputting means may be a computer terminal connected to the host computer via a communications network. In addition, accumulated data of a database may be updated by the input.

This video game is mainly played in parallel with an actual sports contest (although it is also possible to play the video game while replaying on a VCR a video a recorded program of sports game in the past). Therefore, the video game player must be situated in an environment where he is able to know the progress of the sports contest, that is, must be in the place holding the sports contest, or must view or listen to a live broadcast on a television or a radio. If computer terminals are utilized, the present invention may further include live broadcasting means for broadcasting live by transmitting the progress of an actual sports game as text, sound and/or image information to each computer terminal via a communications network or a broadcasting network. Communications networks include the internet, personal computer communication and the like, and images, texts and data broadcasting and so on by bitcast on ground-based broadcasting and satellite broadcasting and the like are applied as broadcasting networks.

The determining means determines whether the predictions are right or wrong by comparing the actual results with the video game player's prediction and with the data-based prediction. For example, if the next pitch is predicted, the determining means determines that the type and course of the pitch are both predicted correctly, that one of them is predicted correctly, or that neither of them is predicted correctly, and so on. If neither is predicted correctly, whether the predictions are close to the correct answer or not is also taken into consideration. If the number of video game players is one, victory or defeat is determined based on which of the video game player's prediction and the data-based prediction is superior. The predictions may be made about more than one factor. For example, the video game player's predictions and the data-based predictions since the start of the video game are counted up, and victory or defeat of a game player is determined based on the difference in number of correct predictions between the video game player's predictions and the data-based predictions. If a host computer and a computer terminal are used, a plurality of computer terminals may be connected to present a plurality of the video game players. In this case, victory or defeat and a ranking may be determined between the players or a prize may be given to every player who achieves a certain level of performance. In such a case, a data-based prediction may be displayed on a display of a computer terminal before the players input their own predictions and may only be used to serve as a reference for the video game player's predictions. Similarly, predictions of commentators and professionals also can be displayed as references on a display of a computer terminal.

DETAILED DESCRIPTION OF THE PREFERRED EMBODIMENTS

A game apparatus, method, storing medium and transmitting medium for predicting sports results in accordance with the present invention will now be described with reference to the accompanying drawings.

First Embodiment

Figure 1:
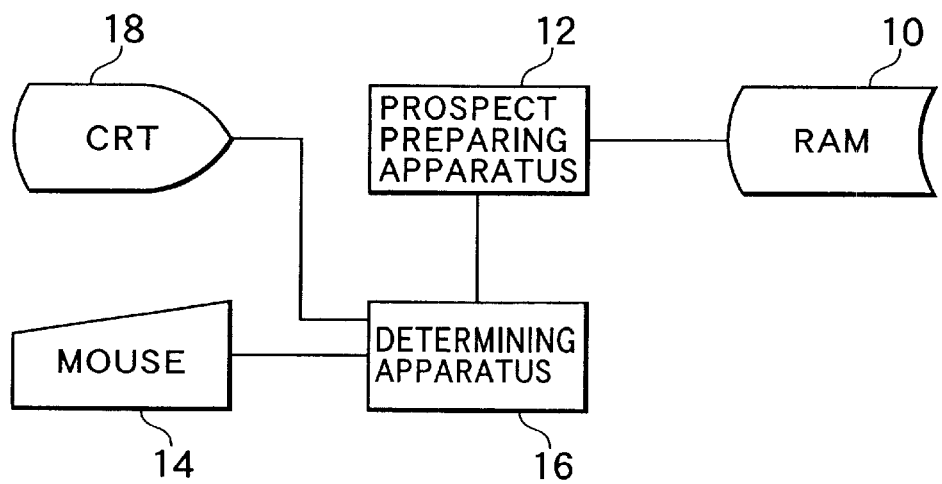
FIG. 1 is a block diagram illustrating a major configuration of a first embodiment of a game apparatus for predicting results of sports in accordance with the present invention.

FIG. 1 is a block diagram illustrating a major configuration of a first embodiment of a game apparatus for predicting sports results in accordance with the present invention. An apparatus shown in FIG. 1 is a game for predicting the next pitch in the professional baseball, and is composed of a computer and a program installed in the computer. The program is either stored in a storing medium such as a floppy disc, a hard disc, a CD-ROM to be read into the computer, or transmitted to the computer via a transmitting medium such as the internet and personal computer communication.

In this figure, a RAM 10 stores as data a plurality of factors that change and/or are generated and disappear in accordance with the change of the situation of a game for professional baseball games actually performed in the past. A prediction preparing (also referred to herein as "prospect preparing") apparatus 12 prepares a data-based prediction on how at least one prediction subject factor among the plurality of factors changes and/or is generated and disappears under the situations specified by the plurality of factors based on the data read out from the RAM 10. In this embodiment, the plurality of factors are teams, scores, counts (strike, ball, out), whether bases are empty or runners are on base, specific pitchers and specific batters (specified by names and uniform numbers) and types and courses of the ball thrown by a pitcher, and a prediction subject factor is a type and a course of a ball to be thrown by the pitcher next. A mouse 14 is operated by a video game player to input the plurality of factors, a video game player's prediction on the prediction subject factor and results of the prediction subject factor. The plurality of factors are input to the prediction preparing apparatus 12 via a determining apparatus 16. The video game player's prediction and the results are input to the determining apparatus 16 via the mouse 14 and the data-based prediction is also input thereto from the prediction preparing apparatus 12. The determining apparatus 16 determines for each prediction whether the video game player's prediction and a data-based prediction are right or wrong by comparing the results with the video game player's prediction and with a data-based prediction. The prediction preparing apparatus 12 and the determining apparatus 16 comprises a CPU. A CRT 18 displays each data as images.

Figure 2:
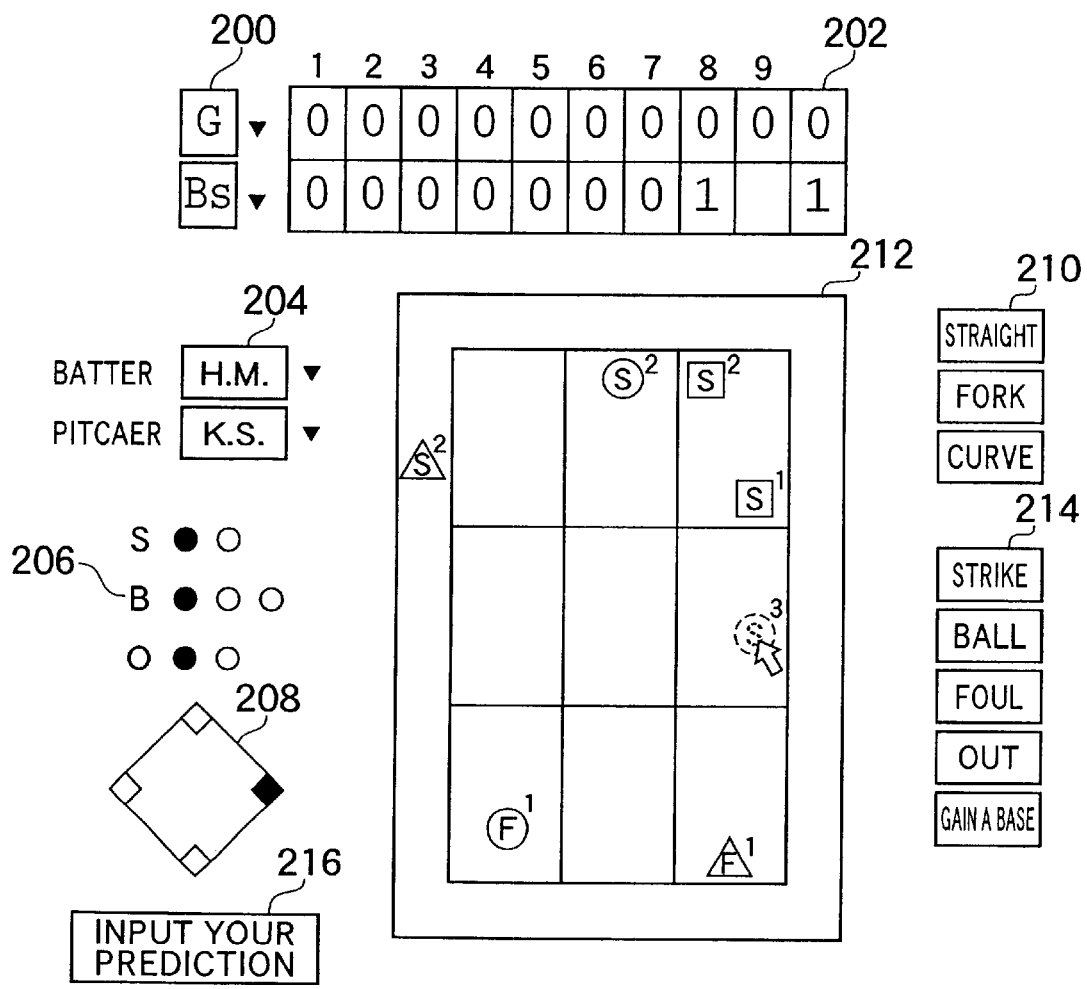
FIG. 2 illustrates a screen displayed on a CRT of the embodiment shown in FIG. 1.

FIG. 2 illustrates a GUI screen of the CRT 18 of the apparatus shown in FIG. 1. With reference to this drawing, an operation of this embodiment will now be described. First, a video game player sets a plurality of factors. Various bars, dialogue boxes, icons and the like are displayed on the GUI screen, and the video game player sets factors corresponding to the situation of a game of baseball by the operation of the mouse 14. The video game player first specifies two teams in the game by operating a dialogue box 200. In this embodiment, the team that is at bat at the top is "G" and a team that takes the field first is "Bs". Then a score 202 is set. The figure in the score changes in accordance with how many times a part of the display allocated to each inning is clicked. The total score is displayed to the right of the screen. Then a batter and a pitcher are specified by a dialogue box 204. By the setting of a team and a score, the name of a batter and the name of a pitcher to be displayed in the dialogue box 204 are limited to batters and pitchers in the set team. That is, since the game is in the top of the ninth inning and the team G is at bat, a plurality of batters of the team G are displayed as the batter, a plurality of pitchers of the team Bs are displayed as the pitcher, and the batter and the pitcher are specified by selecting one name for each. In the drawing, the batter is H. M. and the pitcher is K. S. A count 206 is used to specify strike, ball and out counts, and when one of dots of 206 is clicked, the color of the dot changes to indicate the count. In the drawing, the count is one out, strike one and ball one. Lastly, a runner 208 on base is set. When a base occupied by a runner is clicked, the color of the base changes. In the drawing, a runner is on first base.

When the situation of a game of baseball is set as mentioned above, a video game player's prediction can be input. The video game player's prediction is about the type and the course (location at home plate) of a ball thrown by the pitcher next. First, a type of ball is specified by a type-of-ball bar 210. There are three ball types (types of pitches): straight, fork and curve. Since the pitcher K. S. only throws these three types of pitches, only three bars are prepared. The number of the bars may be increased or decreased for other pitchers. Then a course of ball is specified by moving an arrow on a course display 212. The course display 212 shows a strike zone in nine divisions where inside/outside, center, high, low and middle are combined. In the course display 212, video game player's predictions (circle), data-based predictions (square) and results (triangle) of the first pitch and the second pitch for the same batter are already displayed. The one displayed by a dotted line at the tip of an arrow is the video game player's prediction that is currently being input. In the drawing, the video game player sets a prediction of the type of ball (it is S here, i.e., straight) as the outside of the middle height. When clicked, the dotted line of the video game player's prediction changes to a solid line.

In parallel with the above or after the video game player's prediction is finished, a data-based prediction by the prediction preparing apparatus 12 is prepared. A data-based prediction is generated based on the past win-loss records data regarding the pitcher K. S. and the batter H. M. If the illustrated specific situation, that is, in the ninth inning, with the score 1 to 0, and the count one out, one on, strike one and ball one having taken place in the past, a data-based prediction is prepared on the premise that it is highly possible that a type and a course of ball actually thrown at that time is selected again. More concretely, a data-based prediction is prepared in accordance with the following procedures: (1) the situation of a game of baseball is specified from teams, scores, counts (S, B, O), whether bases are empty or runners are on bases, a specific pitcher and a specific batter; (2) retrieving from the RAM 10 a type and a course of the next pitch in the past situations specified in (1), calculating a percentage of the same type and course of pitched ball, and if the calculation result is equal to or greater than 75%, it is regarded as a data-based prediction; (3) if (2) is less than 75%, calculating a percentage of s type and a course of ball pitched by the specific pitcher in the past at batters who are similarly left-handed or right-handed and belong to the same team as the specific batter and, if the calculation result is equal to or greater than 75%, it is regarded as a data-based prediction; (4) if (3) is less than 75%, calculating a type and a course of ball pitched by the specific pitcher in the past at all the batters belonging to the same team as the specific batter and, if the calculation result is equal to or greater than 75%, it is regarded as a data-based prediction; and (5) if (4) is less than 75%, calculating a percentage of a type and a course of ball pitched by the specific pitcher in the past at all the batters in all the teams, and regarding a type and a course of ball with highest percentage is regarded as the data-based prediction.

The data-based prediction prepared as mentioned above is displayed as a square on the course display 212. The display is conducted after the video game player's prediction is fixed. Alternatively, it can be displayed for reference right after the data-based prediction is completed, even the video game player's prediction is not yet fixed.

The video game is played by the video game player while he/she watches an actual game of professional baseball in the ballpark or views or listens to a live broadcast of a baseball game on a television or a radio. The player should try to finish inputting a prediction by the time a pitcher actually makes a pitch, and then inputs the result as well. First, a type and a course of ball are specified by the same procedures as the prediction input. The result is used to determine for a video game player's prediction and for the data-based prediction whether the predictions are right or wrong. Further, how the situation is changed by that pitch is input. When the batter lets a pitch go by or swings and misses the ball and an umpire calls strike, a "strike" bar is clicked to count up the strike count displayed in the count 206. When an umpire calls ball, a "ball" bar is clicked to count up the ball count displayed in the count 206. If a "foul" bar is clicked in the case of a foul ball, the strike count increases except when it is already strike two. In the case of a strike out or an out due to mishit, an out count increases upon clicking on an "out" bar. If a batter gains a base by a hit or by drawing a walk, a "gain a base" bar is clicked and an input is made with respect to the runner 208 and the score 202 if necessary. For example, when runners proceed to first and third base by a hit, the third base of the runner 208 is clicked, and in the case of a homer, all the indicators indicating runners on bases are turned off and "2" is displayed in the column of the top of the ninth inning of the score 202. In either case, there might be a necessity to change the runner 208 and the out count as when the runner is caught trying to steal a base, comes home on a sacrifice fly, or is called on a double play. When a batter strikes out or gains a base, the next batter is input or a team at bat changes and the above-mentioned procedures are repeated. These operations progress in accordance with a message 216. For example, when the game apparatus reaches a state where it is ready to accept a video game player's prediction, a message "Input your prediction" is displayed as shown in the drawing and, if it is necessary to input a batter, a message such as "Input batter" is displayed. When an actual game result is input, a brief review may be provided on the performance of the video game player's prediction, such as "Splendid, your prediction is proved right", "Very close, the course is right", "Sorry, you missed both". Further, the video game player is notified of appropriate procedures by the blinking or the repeated changes of colors of a part that should be operated next.

The determining apparatus 16 determines for each of the video game player's prediction and the data-based prediction whether the predicted type and course of a pitched ball are correct or not by comparing the result with the video game player's prediction and with the data-based prediction. Reviewing the illustrated situation, that is, the performance up to the second pitch against the batter H. M., the video game player predicted the first pitch as a knee-high fork ball with respect to the left-handed batter H. M., and the prediction preparing apparatus 12 predicted a pitch that is straight, high and outside. The result was a low and outside fork ball, which means that the video game player correct predicted the type and height of the pitch and the data-based prediction was correct only about whether the ball is inside or outside. The video game player predicted the second pitch to be straight, above the center, and the data-based prediction predicted the pitch to be straight, high and outside. The result was a straight pitch chest-high and inside. Both the video game player's prediction and the data-based prediction were correct as to the type and height of ball, but the video game player's prediction of the ball's course was closer to the result of the inside pitch. Therefore, the video game player's prediction would be determined as superior at this stage. Each time a prediction is made and a result is input, the determining apparatus 16 rates the prediction performances of the video game player and of the prediction preparing apparatus and victory or defeat is determined by which of the video game player or the computer (the prediction preparing apparatus 12) is superior, taking into consideration the total score of the performances and the percentages of correct predictions throughout the game until its completion.

As described above, a game apparatus for predicting sports results in accordance with the first embodiment is for multiplying the fun in watching baseball by allowing a video game player and a computer to predict the next pitch between successive pitches, and to compare the video game player's prediction and the computer's data-based prediction. Moreover, the video game itself is the kind that piques intellectual curiosity.

Second Embodiment

Figure 3:
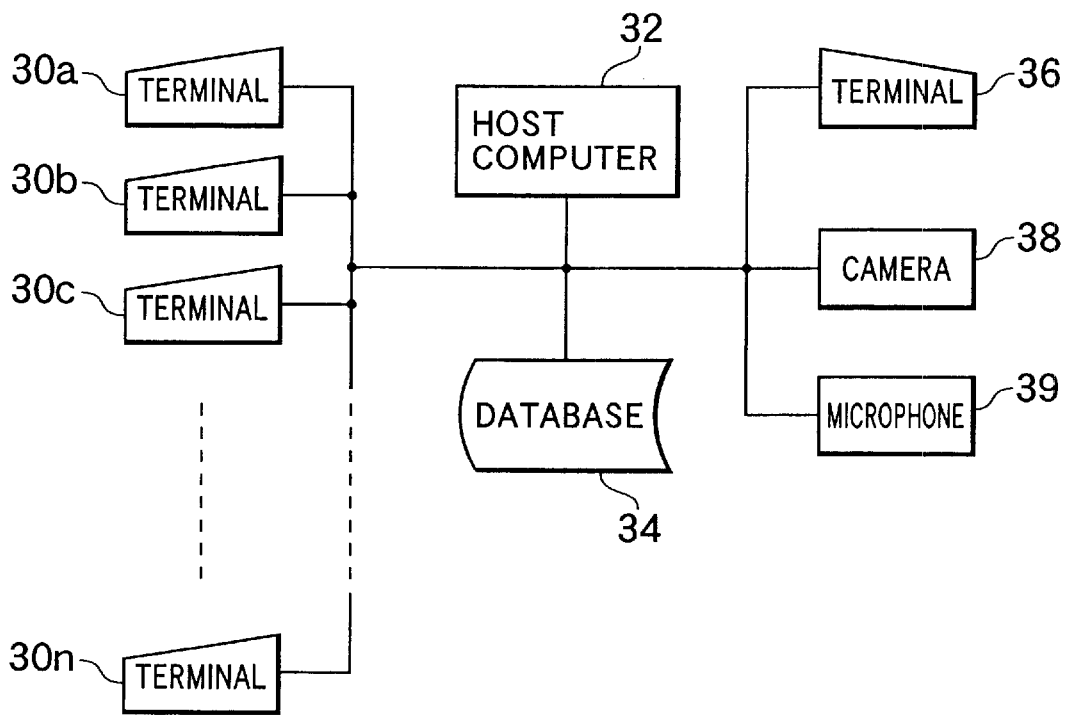
FIG. 3 is a block diagram illustrating a major configuration of a second embodiment of a game apparatus for predicting sports results in accordance with the present invention.

FIG. 3 is a block diagram illustrating a major configuration of a second embodiment of a game apparatus for predicting results of a sports game in accordance with the present invention. This embodiment is for a plurality of game players using computer terminals and a host computer. Computer terminals are used for inputting predictions and other functions are performed by the host computer and databases and the like connected to the computer terminals via the internet. A program for enabling the computer terminals to perform the function of inputting predictions, other apparatuses to execute processing of the input predictions, and the computer terminals to display the process, is installed in the computer terminals via the internet as a transmission medium, or is read out from a recording medium such as a floppy disc.

Computer terminals 30a, 30b, 30c, ..., 30n are connected to a host computer (server) 32 via the internet (intermediaries such as providers are omitted in the drawing). A database 34, a computer terminal 36, a camera 38 and a microphone 39 are connected to the host computer 32. The computer terminal 36, the camera 38 and the microphone 39 are disposed outside a baseball stadium. Each of the computer terminals 30 are prediction inputting apparatus of the game apparatus for predicting results of sports, the database 34 is a storing apparatus, the host computer 32 is a prediction preparing apparatus and a determining apparatus, the computer terminal 36 is a result inputting apparatus, and the camera 38 and the microphone 39 are live broadcasting apparatuses.

Signals representing images and sounds that are converted to electrical signals and converted to binary data by the camera 38 and the microphone 39 via the host computer 32 are transmitted to each of the computer terminals 30 and the progress of a sports game is broadcast live. A video game player in front of one of computer terminals 30 can enjoy the broadcast with images and sounds and at the same time can take part in a prediction competition by operating the computer terminal. The host computer 32 can read out information useful for the prediction from the database 34 and transmit the information to each of the computer terminals 30.

The database 34 is a commercial database storing a plurality of factors representing situations of games of professional baseball in the past. The factors include various kinds of information such as performances of teams, performances of players on the teams, stuff of the respective pitchers and tactics adopted. The host computer 32 receives necessary data from the database 34 to prepare a data-based prediction, and at the same time determines whether video game players' predictions respectively input from each of the computer terminals 30 and a data-based prediction prepared by the host computer 32 are right or wrong by comparing them with a result input from the computer terminal 36.

Figure 4:
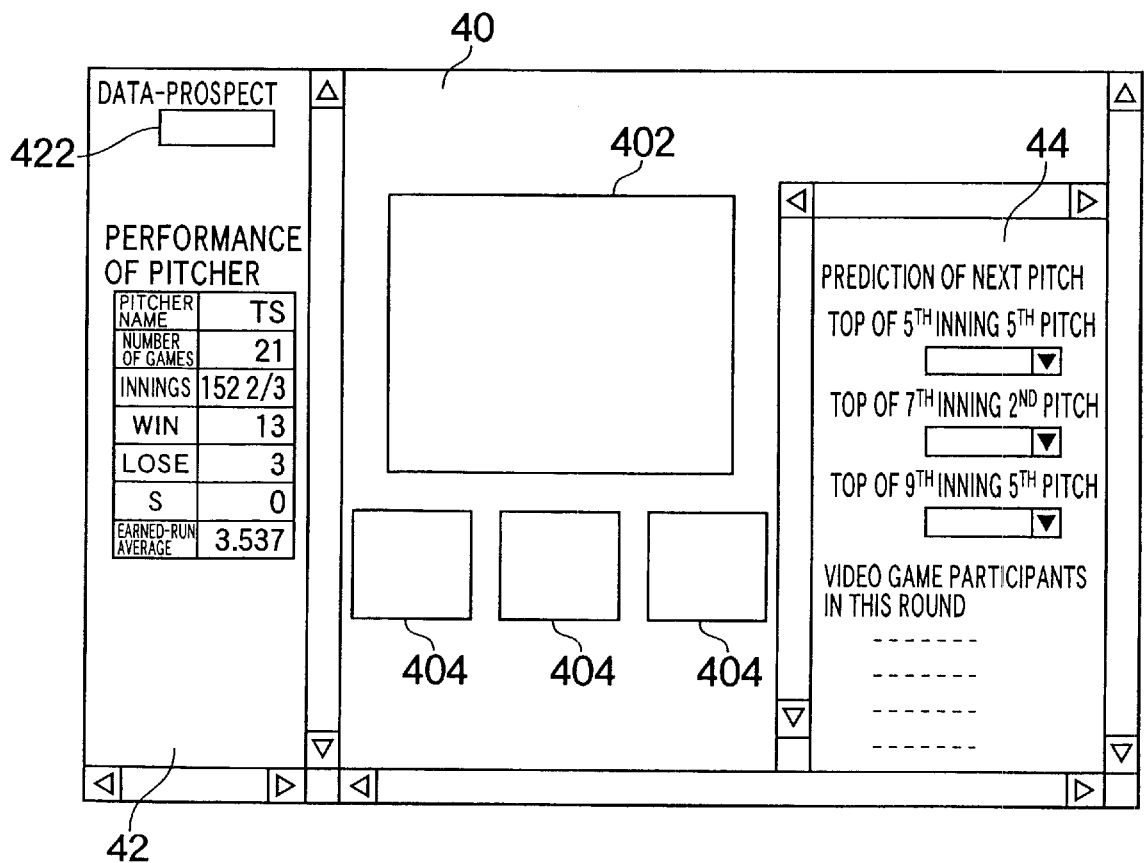
FIG. 4 illustrates a screen of a display of a computer terminal of the embodiment shown in FIG. 3.

FIG. 4 illustrates a part of a screen of the respective computer terminals 30. FIG. 4 shows a window divided into three parts, which are called a video window 40, a reference data window 42, and a prediction inputting window 44, respectively. The video window 40 includes one large video 402 and three small videos 404. When one of the small videos 404 is clicked, an image that has been displayed in the large video 402 and an image that has been displayed in the clicked small video 404 switch their locations. Performance of a pitcher and other data are displayed in the reference data window 42. Questions and dialogue boxes for inputting answers are displayed in the prediction inputting window 44. That is, a pitch to be a subject of prediction is specified, such as "the top of fifth inning, fifth pitch", "top of seventh inning, second pitch" and "top of ninth inning, third pitch" below the title "next pitch". The video game player operates the computer terminal to select a type of pitch to be predicted, for example, "straight", "fork ball", "curve", "slider", "sinking fast ball" and "change-up". When a type of pitch is to be selected, data such as the performance of a pitcher in the reference data window 42 and a data-based prediction 422 prepared by the host computer 32 are provided to the video game player for reference.

This game apparatus has an element of a quiz more than that if a competitive game, for a prize is presented to video game players with a good performance (for example, those with a performance that is better than the data-based prediction of the host computer 32 or those who answered all the questions correctly). However, by incorporating such an interactive game, an added value of the live broadcasting by the internet is improved and those who are not paid-subscribers will be prompted to sign-up.

Embodiments of the present invention have thus been described, but the invention is not limited to the above embodiments. Needless to say, the game apparatus, method, storing medium and transmitting medium for predicting sports results may be carried out in a suitably modified form within the gist of the present invention.

As can be seen from the above, the game apparatus, method, storing medium and transmitting medium for predicting sports results according to the present invention allows a user to play an intellectual video game in which the user predicts actions of a sports player in parallel with the progress of a sports game.

What is claimed is:

1. A game apparatus for predicting results of sports, comprising:
   a storing module for storing factor data obtained by converting into data a plurality of factors, each of which either changed, or was generated and then disappeared, in accordance with changes in situations of each game or for a plurality of sports games previously actually performed;
   a prospect inputting module for inputting a video game player's prediction on how a prediction subject factor will change, or be generated and then disappear, in the situations specified by said plurality of factors for at least one prediction subject factor of said plurality of factors;

a prospect preparing module for preparing a data-based prediction about said prediction subject factor based on factor data read out from said storing module; and a determining module for receiving inputs including said video game player's predictions, said data-based prediction, and results of prediction subject factor, and for determining for each of the player's and data-based predictions, whether it is right or wrong by comparing each of said player's and data-based predictions with the results, wherein said sports game is baseball, and said prediction subject factor is a type and a course of a next pitch that a pitcher throws, wherein said data-based prediction is generated based on won-lost records data regarding a specific pitcher and a specific batter; and wherein said data-based prediction is generated in accordance with a procedure that includes:

(1) specifying situations of a game of sports from teams, scores, counts, whether bases are empty or runners are on bases, a specific pitcher and a specific batter;

(2) retrieving from said storing module a type and a course of the next pitch in previous situations specified in (1), calculating a percentage of the same type and course of ball, and in the case where the calculation result is equal to or greater than a given percentage, it is regarded as a data-based prediction;

(3) in the case where (2) is less than the given percentage, calculating a percentage of a type and a course of ball pitched by said specific pitcher in the past at batters who are similarly left-handed or right-handed and belong to the same team as the specific batter and, in the case where the calculation result is equal to or greater than a given percentage or more, it is regarded as a data-based prediction;

(4) calculating a type and a course of ball pitched by the specific pitcher in the past at all the batters belonging to the same team as the specific batter in the case where (3) is less than the given percentage, and, in the case where the calculation result is equal to or greater than a given percentage, it is regarded as a data-based prediction; and (5) calculating a percentage of a type and a course of ball pitched by the specific pitcher in the past at all the batters in all the teams in the case where (4) is less than the given percentage, and regarding a type and a course of ball with highest percentage as a data-based prediction.

2. A game apparatus for predicting results of sports games comprising:

a storing module for storing factor data obtained by converting into data a plurality of factors that changed, or were generated and then disappeared, respectively in accordance with changes in situations of each sports game for a plurality of sports games actually previously performed;

a prospect inputting module for inputting a video game player's prediction of how a prediction subject factor will change, or be generated and disappear, in the situations specified by the plurality of factors for at least one prediction subject factor of the plurality of factors;

a prospect preparing module for preparing a data-based prediction about the prediction subject factor based on factor data read out from said storing module;

a determining module for receiving inputs, including the video game player's prediction, said data-based prediction and results of the prediction subject factor, and for determining for each of the player's and data-based predictions whether it is right or wrong by comparing each of the player's and data-based predictions with the results of the prediction subject factor; and a display for displaying the video game player's predictions and the data-based predictions before inputting the latest results of the prediction subject factor into said determining module.

3. A game apparatus for predicting results of a baseball game, comprising:

a storing module for storing factor data obtained by converting into data a plurality of factors, each of which either changed, or was generated and then disappeared, in accordance with changes in situations of each sports game or for a plurality of sports games previously actually performed, the storing factor data including won-lost records data regarding a specific pitcher and a specific batter;

a prospect inputting module for inputting a video game player's prediction on a type and course of a pitcher's next pitch;

a prospect preparing module for generating a data-based prediction of the type and course of the pitcher's next pitch based on factor data read out from said storing module, including the won-lost records data regarding the specific pitcher and the specific batter; and a determining module for (a) receiving inputs including the video game player's and data-based predictions, including the video game player's and data-based predictions of type and course of the pitcher's next pitch, and results of prediction subject factor, and (b) determining for each of the player's and data-based predictions, whether it is right or wrong by comparing each of said player's and data-based predictions with the results, wherein the data-based prediction is generated in accordance with a procedure that includes:

(1) specifying situations of a baseball game from teams, scores, counts, whether bases are empty or runners are on bases, a specific pitcher and a specific batter;

(2) retrieving from said storing module a type and a course of the next pitch in previous situations specified in (1), calculating a percentage of the same type and course of ball, and in the case where the calculation result is equal to or greater than a given percentage, it is regarded as a data-based prediction;

(3) in the case where (2) is less than the given percentage, calculating a percentage of a type and a course of a ball previously pitched by the specific pitcher to batters who are similarly left-handed or right-handed and belong to the same team as the specific batter and, in the case where the calculation result is equal to or greater than a given percentage, it is regarded as a data-based prediction;

(4) calculating a type and a course of ball for all past pitches by the specific pitcher to all the batters belonging to the same team as the specific batter in the case where (3) is less than the given percentage, and, in the case where the calculation result is equal to or greater than a given percentage, it is regarded as data-based prediction; and (5) calculating a percentage of a type and a course of past pitches by the specific pitcher to all the batters on all the teams in the case where (4) is less than the given percentage, and regarding a type and a course of ball with highest percentage as data-based prediction.

* * * * *